Sept. 24, 1968              C. W. HARGENS III            3,403,263
METHOD AND APPARATUS FOR OPTICAL FIBER CURVE
FOLLOWER INCLUDING METHOD AND APPARATUS
FOR MAKING POSITION SCALE THEREFOR
Filed Oct. 16, 1964                                       2 Sheets-Sheet 1
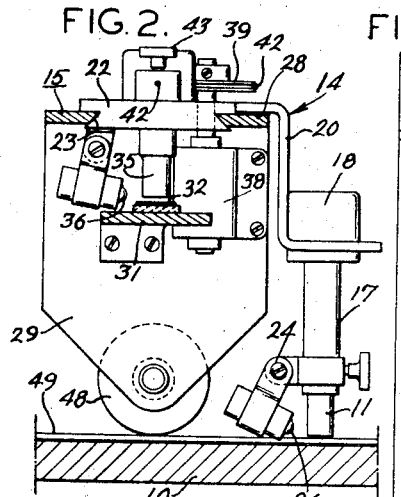
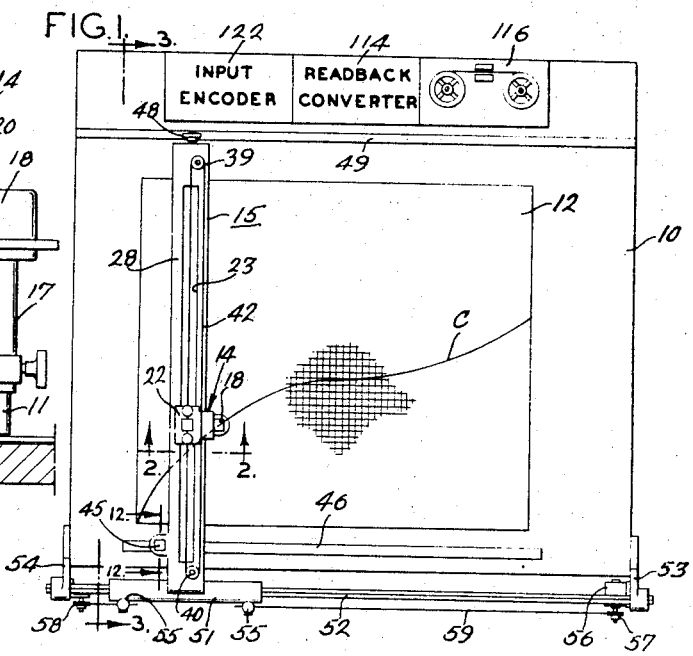
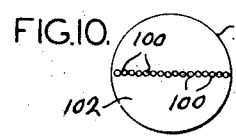
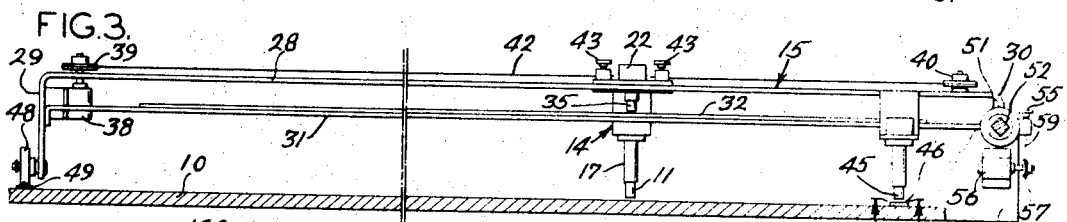
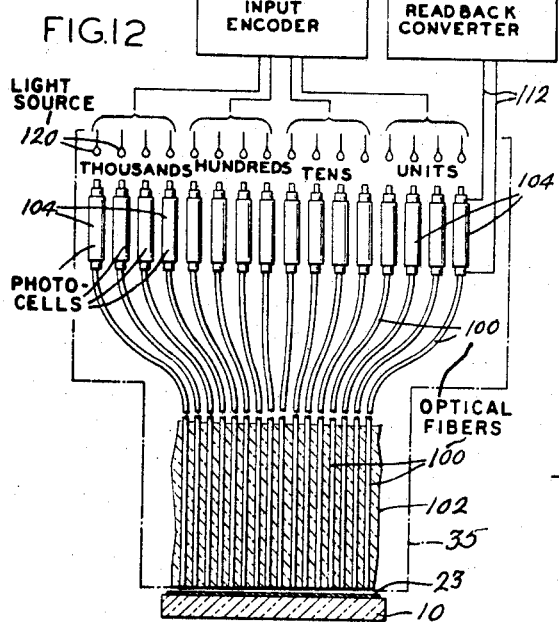
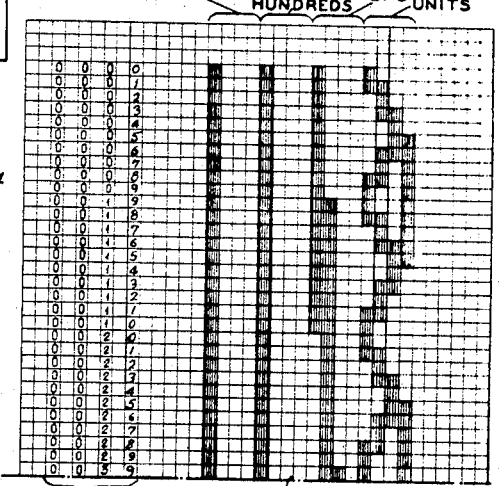
INVENTOR:
CHARLES WILLIAM HARGENS, III
BY
ATTYS.

Sept. 24, 1968    C. W. HARGENS III    3,403,263
METHOD AND APPARATUS FOR OPTICAL FIBER CURVE
FOLLOWER INCLUDING METHOD AND APPARATUS
FOR MAKING POSITION SCALE THEREFOR
Filed Oct. 16, 1964    2 Sheets-Sheet 2
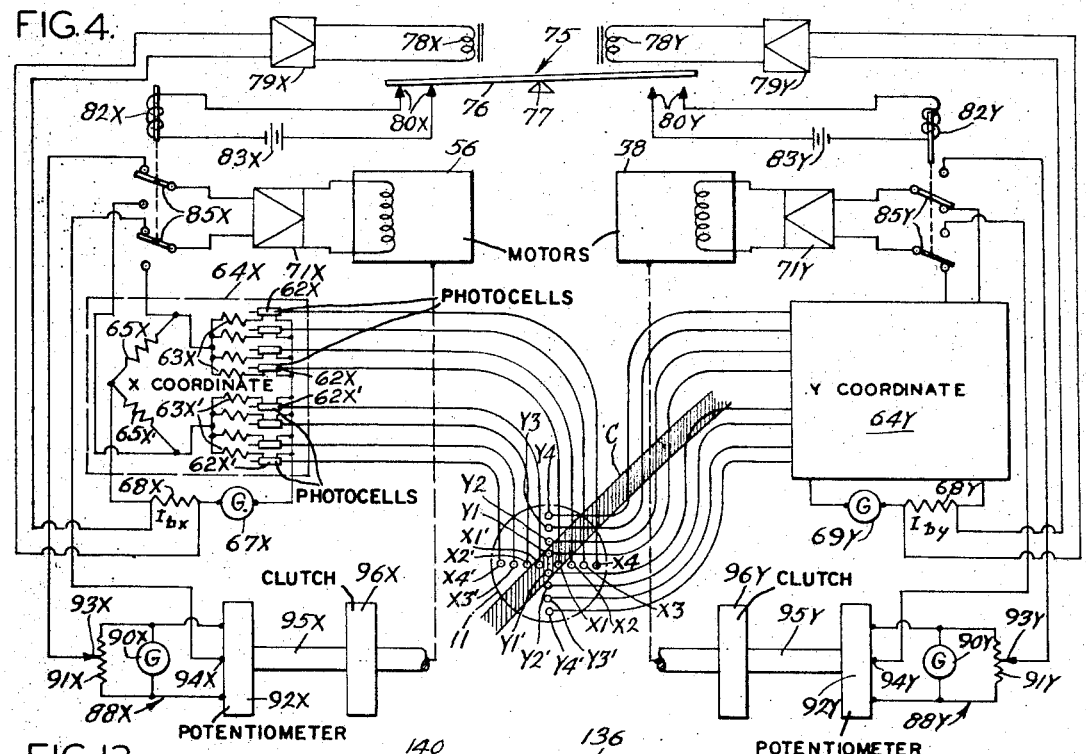
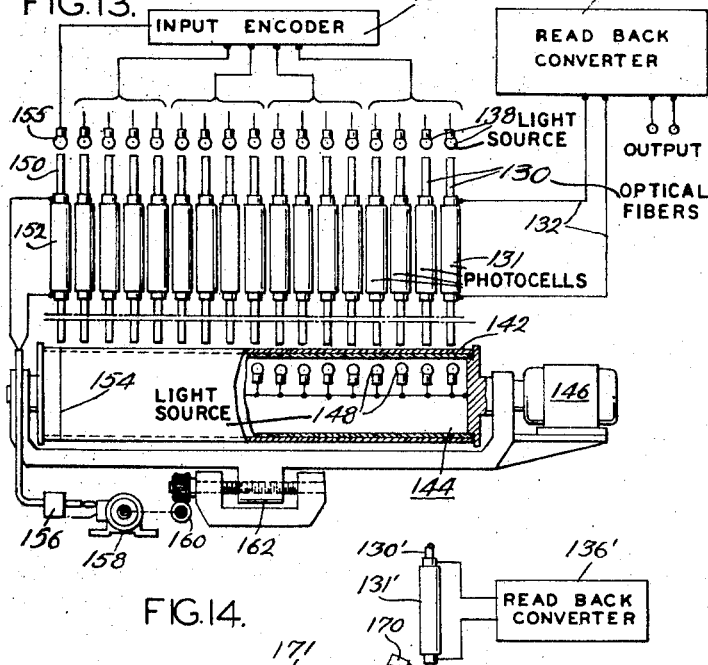
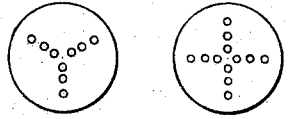
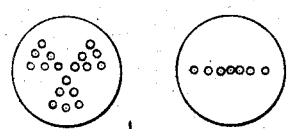
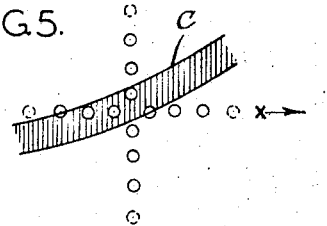
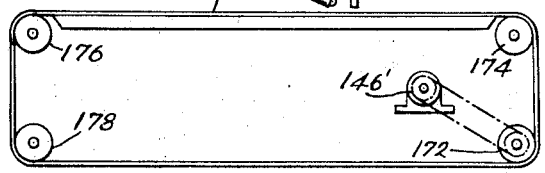
INVENTOR;
CHARLES WILLIAM HARGENS, III
BY
Howson & Howson
ATTYS.

United States Patent Office 3,403,263
Patented Sept. 24, 1968

3,403,263
METHOD AND APPARATUS FOR OPTICAL FIBER CURVE FOLLOWER INCLUDING METHOD AND APPARATUS FOR MAKING POSITION SCALE THEREFOR
Charles W. Hargens III, Philadelphia, Pa., assignor to The Franklin Institute, Philadelphia, Pa., a corporation of Pennsylvania
Continuation-in-part of application Ser. No. 272,013, Apr. 10, 1963. This application Oct. 16, 1964, Ser. No. 404,218
16 Claims. (Cl. 250—202)

ABSTRACT OF THE DISCLOSURE

A curve follower including a movable scanning head suported on a bridge structure which in turn is movable relative to a curve support base. Drive means are supplied to move the scanning head and other drive means are supplied to move the bridge. The scanning head contains a plurality of optical fibers in a closely grouped array positioned to pick up light reflected from the curve illustration when associated with individual photocells. The fibers and photocells are preferably divided into at least two groups, one group of which is designed to actuate the scanning head drive member and the other group of which is designed to actuate the bridge drive member. A switching circuit is provided whereby upon predetermined conditions one group of photocells or the other is effective and the drive means for the other group is connected to a power source to provide an independent drive movement. Preferably scale means is provided using additional sensing heads movable with the scanning head and the bridge means respectively and cooperating with scales on the structure relative to which this movement occurs, which scales have patterns which are unique for each position of the respective sensing heads. The coded scales for the sensing heads may be made using light sensitive strips and transmitting light through the fibers intended to sense light or dark of the scale to provide a unique pattern of light and dark across each row representing a given position or station of the associated movable means.

---

This invention relates to optical transducer means employing the art of fiber optics, and, more specifically, to transducer devices employing the ends of optical fibers in a close spaced relationship for the purpose of either sensing light from a surface or optically creating a pattern on a surface.

This is a continuation-in-part of my U.S. patent application, Ser. No. 272,013, filed Apr. 10, 1963 and now abandoned.

The present invention advantageously makes use of a filamentary photocell device described in my U.S. Patent No. 3,310,680 entitled "Optical Filamentary Photocell Device Having Spaced Electrical Conductors Arranged in a Matrix" and dated Mar. 21, 1967. In the specification and drawings of that patent, there is described a filamentary photocell located around the periphery of an optical fiber, which has been roughened in that region by etching to permit local emergence of light. The roughened zone is coated with a photosensitive electrically conductive material and is provided with electrodes at the ends of the zone which are connected to elertrical conductors which are used to connect the photocells to any desired circuit. The photosensitive areas are covered with an opaque light-excluding jacket or sheath to prevent confusion of fiber transmitted signals with those which might otherwise be generated by external ambient lighting.

It is well known in the art that fiber optics is based upon the use of very small fibers of glass or a like material which conduit light along their length by the process of total internal reflection. Ordinarily the fibers may be turned or twisted out of alignment with the position of their pickup end without distortion, deterioration or loss of the light conducted. Fibers may be thinner than human hairs, having diameters of .001 inch or less in some cases, although they may be larger as the occasion requires. Their usefulness in connection with the present invention, however, depends to a large extent upon their smallness in size, at least relative to the lines or patterns observed or monitored by the fibers.

It is known to group fibers together for the purpose of transmitting a picture or an image of an object from one location to another, for example. It is also known to use individual fibers as transmission lines for coded information. Until the advent of my co-pending invention, however, it was not known to use fibers in groups or arrays to produce coordinated coded signals. The use of fibers in this manner is feasible because of the inherently small sizes of the fibers involved. In accordance with the present invention, fiber arrays are used with their sensing ends fixed in a predetermined array which is not used for transmitting a picture, but rather either for sensing a contrasting line or contrasting pattern on a surface or for following a curve under certain circumstances.

One example of a use of the present invention is in a line sensing operation. The fiber ends may be arranged in a predetermined pattern wherein, for example, a dark line on a light background will be sensed by the lack of reflection of light from the line as compared to the rest of the surface which does readily reflect light. In preferred embodiments, the fibers may be arranged such that they produce signals which initiate or continue movement, driving the scanning head containing fiber ends, for example, by actuating movement of the scanning head in at least one direction. Such an action coupled with transverse independent drive motion enables curve following which is one of the primary functions of the present invention.

A typical curve follower in accordance with the present invention, as with most two dimensional curve followers, involves a pair of axes ordinarily, but not necessarily, at right angles to each other and ordinarily a curve which may typically be on paper supported on a flat support base. Bridge means moves across the support base in a predetermined manner in accordance with and in response to bridge drive means. A scanning head moves in a predetermined path along the bridge transverse to the direction of movement of the bridge and is also provided with a drive means. The scanning head is provided with a plurality of optical fibers having their ends fixed in a closely grouped array to pick up light reflected from the curve bearing surface. In order for the device to be operable, a photocell is provided for and associated with each of the optical fibers. Each of the photocells is coupled to appropriate circuitry which is associated with one of the drive means. The circuitry effectively couples the photocells and thus related fibers to suitable means for operating the respective drive means to cause the fiber array or sensing head to center on the curve. In the preferred embodiment of operating the present invention, one drive motor is coupled by the circuit means to selected photocells to cause centering on the curve, while the other drive means is arranged to operate independently. Preferably, as will be described hereafter, the respective drive means may be switched from one function to the other.

Such a curve follower has limited usefulness unless means is also provided to record the coordinate positions of the scanning head at least periodically. In accordance with the present invention, sensing means, like that used to sense and follow the curve, may be used to track coded scales in the direction of movement of the bridge and in the direction of movement of the scanning head. The scales are preferably located along the support base and bridge, respectively, and are tracked by sensing means located on the bridge and scanning head carriages, respectively.

In accordance with the present invention, the same type of position sensing means useful to sense coordinates in a curve-following device are useful in other applications to indicate coordinates, or for other similar purposes. Further, the system used to follow the coordinates can be used in reverse with some modification to make the coordinate scales, or scales for some other purpose, useful with such fiber array sensing heads. There are numerous alternate means of accomplishing these results and several of these will be discussed hereafter.

For a better understanding of the present invention, reference is made to the following drawings, wherein:

FIG. 1 is a plan view of a coordinatograph or mechanical drafting apparatus in accordance with the present invention providing curve following and coordinate recording functions;

FIG. 2 is an enlarged side elevational view of the carriage supporting the curve following scanning head and related apparatus taken along line 2—2 of FIG. 1;

FIG. 3 is a sectional view taken along line 3—3 of FIG. 1 showing the carriage supporting bridge structure in elevation;

FIG. 4 is a schematic diagram of the photosensing means and a preferred overall electrical system of the curve following apparatus shown in FIGS. 1–3;

FIG. 5 is a schematic diagram showing the light sensing fiber ends in the scanning head of FIG. 4 in relation to a section of a curve;

FIG. 6 is a schematic view of another possible arrangement of the optical fiber ends in the scanning head;

FIG. 7 is a view similar to FIG. 5 showing the preferred arrangement of the fiber ends in the scanning head;

FIG. 8 is a view similar to FIGS. 6 and 7 showing a still different arrangement of the fiber ends;

FIG. 9 is a view similar to FIGS. 6–8 showing still another arrangement of the fiber ends;

FIG. 10 is a view similar to those of FIGS. 6–9 showing an arrangement of light sensing fiber ends in a sensing head for following a coded coordinate scale used to identify position along one of the axes of the apparatus of FIGS. 1–3 and is a view taken along line 10—10 of FIG. 3;

FIG. 11 is a greatly enlarged diagrammatic plan view of a portion of a binary decimal coded coordinate chart showing the equivalent decimal numbers;

FIG. 12 is a schematic representation showing an optical fiber recording arrangement which may be used alternatively to create a chart or read coordinate positions from a chart of the type shown in FIG. 11, the lower part of the diagram from the broken portion of the fibers being also representative of a sectional view of the sensing head taken along line 12—12 of FIG. 1;

FIG. 13 is a schematic representation of alternative apparatus to the one shown in FIG. 12 which may be used to create or read codes of the general type shown in FIG. 11; and FIG. 14 is a schematic side elevational view of a recording device somewhat similar to the one shown in FIG. 12 using a band arrangement instead of a drum arrangement for movement of the chart.

Referring first to FIGS. 1 to 3, a coodinatograph of the general type familiar to drafting rooms is illustrated. However, this device has been modified in accordance with the present invention in order to enable it to follow curves placed on the base 10, which preferably is a drafting table or enlarged drafting board. This present invention in the preferred arrangement provides the scanning head 11 with two degrees of linear motion in order to follow a selected curve C on curve illustration 12 fixed to table 10. The curve illustration may, of course, be made directly on the base or on a separate surface, usually paper, supported on the base. The movement of the scanning head is done while keeping the head in the attitude relative to and at a minimum height above the surface of the base for adequate pickup of reflected light from the curve illustration and without any component of rotational movement. The two degrees of movement over the plane surface of the base are advantageously right angle coordinate movements which may be familiarly expressed in terms of positions with respect to a horizontal X-axis and a vertical Y-axis. Movement of the curve scanning head along the Y-axis is permitted, as shown in FIG. 2, by mounting the scanning head 11 on a carriage generally designated 14 which is movable parallel to the Y-axis along a bridge structure generally designated 15. Bridge structure 15 is oriented parallel to the Y-axis and is made movable relative to the base 10 along the X-axis. Thus, movement of carriage 14 along the bridge adjusts the position of the scanning head 11 in the Y-axis direction, whereas movement of the bridge as a whole relative to the base 10 results in movement of the scanning 11 to sense any coordinate poistion over the total area behead in the X-axis direction. The combination of movements along the X- and Y-axis enables the scanning head ing monitored.

The scanning head 11 is made up of a grouping or array of optical fiber ends, which will be described in greater detail hereafter. The scanning head which is preferably of a transparent material such as an epoxy resin to allow illumination of the curve illustration beneath the head from the side thereof is supported by a tubular casing 17 terminating on housing 18, which elements may contain the fibers, filamentary photocells and suitable circuitry, which will be described hereafter, for sensing curve position and initiating movement of the bridge or carriage. The scanning head structure as a whole is supported on a bracket 20 fixed to slide 22 which is the guide member of the carriage and advantageously has a keyed portion snugly accommodated in a suitable guide slot 23 in and extending along the bridge structure 15. A suitable bracket 24 on the housing 17 supports a lamp 26 positioned to direct light to the area immediately beneath the scanning head, which light illuminates the area in such a way that from a reflecting surface it is capable of reflection back into the ends of the fibers of the scanning head at such an angle as to be acceptable for transmission through the fiber by its total reflection process.

The bridge structure 15, as best seen in FIG. 3, consists of the main bridge span 28 which provides the slot 23 in which the carriage support member 22 rides. The bridge extends generally parallel to the base 10 almost entirely across the base parallel to the Y axis and terminates at its ends in flange members 29 and 30. Between flanges 29 and 30 and parallel to the span 28, there extends a deck 31 which preferably supports a calibrated coded scale 32 from which the location of the carriage 14 relative to the bridge 15 may be determined.

A code sensing head 35, which is preferably of a transparent material similar to scanning head 11, is suitably supported on slide 22 of carriage 14 and cooperates with the coded scale 32 to determine the position of the carriage relative to the bridge and hence determining the Y coordinate of the scanning head 11. Slide 22 also supports by suitable bracket means a light 36 which illuminates the portion of the coded scale 32 beneath the code sensing head 35. The code sensing head 35 is provided with an array of optical fibers whose ends are preferably arranged as is shown in FIG. 10, an inverted plan view of the sensing head. The nature and operation of the code sensing head will be described in greater degree hereafter.

Movement of carriage 14 along the bridge is provided by suitable drive means, preferably a motor 38, which may be supported on bracket 29, with its shaft vertically orientated, carrying a sheave 39 and positioned at one end of the bridge beyond the range of carriage 14 as determined by the extent of slot 23. A similar sheave 40 is located at the opposite end of the bridge, likewise out of range of the carriage movement. Actual movement of the carriage is accomplished by band 42, which has its opposite ends connected to carriage 14 in any suitable manner, such as by thumb screws 43 which engage and hold the ends of band 42 within eyelets on the carriage and specifically on the slide 22 thereof. The band 42, which is preferably of steel tape or wire, extends around the sheaves 39 and 40 and when drawn sufficiently taut will cause the slide 22 and carriage 14 as a whole to move in one direction or the other along the bridge in response to the rotation of motor 38 in one direction or the other.

The bridge structure 15 carries a code sensing head 45 of a transparent material similar to the Y coordinate code sensing head 35. Code sensing head 45, however, co-operates with a coded scale 46 located on base 10 and arranged to extend and identify coordinate positions in the X-axis direction. Coded scale 46 is, of course, coded to give the X coordinate position of the bridge just as the coded scale 32 gives the Y coordinate position of the carriage 14. Code sensing head 45 is preferably provided with an illuminating light similar to lights 26 and 36 to illuminate the area immediately beneath the code sensing head.

The bridge 15 is supported at flange 29 by a wheel 48 which is supported by said flange and whose axis of rotation extends in the direction of bridge extension. The wheel is adapted to run on a track 49 located on the base 10 parallel to the X-axis. The other end of the bridge is supported from flange 30 and deck 31 by a tubular guide member 51 which snugly encloses and rides on a rail 52 which extends parallel to the X-axis. Rail 52 is supported at its opposite ends from the base 10 by suitable brackets 53 and 54. Bracket 53 preferably also supports the bridge drive means, motor 56, whose shaft carries sheave 57. Bracket 54 carries idler sheave 58 on a shaft parallel to the shaft of motor 56. A suitable band 59, similar to band 42, has its ends affixed to tubular member 51, such as by thumb screws 55, and extends around sheaves 57 and 58 in an open loop. If the band 59 is maintained sufficiently taut, the bridge will be moved in a positive or negative X-axis direction in accordance with the direction of rotation of the motor 56, as the result of corresponding direction of movement of the tubular member 51.

Considering now the schematic drawing of FIG. 4, as well as FIGS. 1–3, a preferred embodiment of the overall system of the curve follower is illustrated. As can be seen in FIG. 4, the curve following scanning head 11 is shown schematically much enlarged as it follows a short portion of curve C. In this embodiment of the scanning head there is an orthogonal grouping of the optical fiber ends so that one group is parallel to the X-axis and the other group is parallel to the Y-axis. Both groups of fibers at their ends, of course, extend generally normal to the surface being monitored. The horizontal or X-axis group of fibers is designated for the sake of convenience X fibers and are numbered outward X1, X2, X3, and X4, respectively, from the center to the right and X1', X2', X3', and X4', respectively, from the center to the left. In similar manner the fibers parallel to the Y-axis are identified Y1, Y2, Y3 and Y4 from the center upward in the positive Y-axis direction and Y1', Y2', Y3' and Y4' from the center downward in the negative Y-axis direction. Remote from the sensing head 11, the fibers, which in practice extend upwardly into the casing 17, may terminate in the housing 18 (see FIG. 2) in filamentary photocells of the type disclosed in my United States Patent No. 3,310,681, referred to above.

In FIG. 4 filamentary photocells associated with the X fibers are shown. These photocells are grouped and generally designated 62X and 62X', respectively, in adjacent arms of the X coordinate bridge 64X, the photocells being associated with the X1, X2, X3, and X4 fibers and the X1', X2', X3' and X4' fibers, respectively. The groups of filamentary photocells 62X and 62X' in adjacent arms of the bridge circuit 64X are arranged with group 62X being connected in parallel in one arm, and group 62X' are connected in parallel in an adjacent arm. Preferably, connected in series with each of the photocells is a resistance. These resistors have been grouped with resistors 63X being associated with cells 62X and resistors 63X' associated with cells 62X'. The individual resistors are connected in series with individual photocells within the parallel connection of cells, thereby effectively increasing the total apparent resistance of each photocell. The resistors may all be equal in size or in each group may be graduated in resistance, the total associated with the respective fibers increasing from a low for X1 and X1' to a high for X4 and X4', respectively, for example. By this arrangement the sensitivity of the bridge circuit to changes in resistance of the photocells is made to decrease from the central fibers to the outside fibers.

The other two arms of the bridge circuit 64X contain resistors 65X and 65X', respectively. Across the bridge between the filamentary photocell groups 62X and 62X' and between the resistors 65X and 65X' there is connected a generator 67X, which may be A.C. or D.C. generator, according to the particular needs of various situations. Connected in series with the generator is a resistor 68X, the voltage drop across which is applied as will be explained hereafter. The output of the bridge circuit is taken from the intermediate terminals thereof in the usual manner.

It will be understood that the Y coordinate bridge circuit 64Y is provided with the filamentary photocells of the Y fibers in a similar arrangement to that of the X coordinate bridge circuit 64X, although the Y bridge circuit has not been illustrated in detail.

Driving the scanning head along to follow the curve C requires that one of the drive means, X motor 56 or Y motor 38, runs independently of the curve as an independent variable. The other drive means can then function as curve following means to move the scanning head parallel to the other axes as a dependent variable when the curve moves off center of the scanning head 11. Assuming, for example, that the scanning head is being driven parallel to the Y-axis by movement of the carriage 14 along the bridge 15 in a motion independent of the curve by drive motor 38, then drive motor 56 which positions the bridge along the X-axis will be actuated as needed to keep the scanning head 11 centered on the curve C as the scanning head's Y-axis position successively changes. The action is relatively simple. As long as the curve is centered so that it overlaps an equal number of X fibers to the left and the right of center (the intersection X group of fiber ends with the Y group of fiber ends), the X coordinate bridge circuit 64X will be balanced and produce no output. However, as the Y-axis coordinate is changed by its independent drive, this balance ceases; for example, when the scanning head is moved upward in the Y direction, fiber end X1' will be exposed to light while fiber end X1 remains darkened and fiber end X2 is also darkened. The flow of light to the respective illuminated filamentary photocells reduces their resistance whereas the darkened photocells increase in resistance. Therefore, the accumulated resistance of photocell group 62X' in the selected example becomes less than the accumulated resistance of photocell group 62X. This causes unbalance of the bridge circuit, thereby producing a flow of current out of the bridge. This flow of current is of such a polarity acting through amplifier 71X and driving motor 56 in such a direction as to move the scanning head laterally to the right until fibers X1 and X1' again cover the curve. If fibers X2, X3 and X4 as well as fibers X2', X3' and X4' all or corresponding fibers on both sides of center assume the same lighting conditions, the bridge circuit returns to a balanced condition. Such step wise adjustment may continue in this manner with the dependent variable drive connecting the position of one coordinate by sensing while the independent variable successively and independently is changed by the other drive means. In this manner, many curves may readily be followed.

It will be observed that if the independent motion had been downward instead of upward, the fiber X1 would have become illuminated and fiber X2' would have become darkened causing an imbalance of the bridge in the opposite direction, a current flow in the opposite direction and an operation of motor 56 in the opposite direction. Thus it will appear that for certain types of curve following operations the type of operation of the scanning head and system of FIG. 4 thus far described is all that is required. However, many curves are not satisfactorily followed in this manner because at some point the curve comes close to paralleling the fiber array (in the case described the X fiber array) which is being used to center the scanning head along the curve. In such instances the orthogonal fiber array shown in FIG. 9 may be employed together with the overall system shown schematically therein in order to permit a switching from the Y motor 38 as the independent drive with the X motor 56 as the dependent drive scanning head curve-centering means to the reverse situation in which the independent drive motion is produced by motor 56 in the X-axis direction and the Y motor 38 becomes the dependent drive means for centering the scanning head along the curve. More specifically, the fibers Y1, Y2, Y3 and Y4 and Y1', Y2', Y3' and Y4' would act on their bridge circuit 64Y in this event exactly as the X fibers acted on their bridge circuit 64X. As previously stated, the Y fibers terminate in photocells in bridge circuit 64Y, which would have a configuration the same as X coordinate bridge circuit 64X. Also, the output of the bridge circuit 64Y is connectable to a suitable amplifier 71Y for operating Y motor 38. The operation of the Y bridge circuit and related connections is exactly the same as that described in regard to the X bridge circuit and related connections.

The selection of whether the X or Y motor will be the independent drive motor and which motor will be the dependent scanning head centering drive motor may be determined by an X-Y selection relay generally designated 75, which consists of a pivoted member 76 pivotable about pivot point 77 and having, for example, coils 78X and 78Y on opposite sides of the pivot connected across the sensing resistors 68X and 68Y, respectively, through appropriate amplifiers 79X and 79Y, respectively. The pivoted member 76 may itself be composed of iron or may be provided with iron cores which are rotated about the pivot one way or the other in accordance with the relative strengths of the magnetic pull of the respective coils 78X and 78Y. These coils may have their own iron cores which attract opposite ends of pivoted member 76 which may be of magnetic material or may act upon iron cores attached to the pivoted member. The relative magnetic pulls of coils 78X and 78Y may have the overall effect of a snap action since one coil will tend to hold the pivoted member in one position until that force is overcome by the force exerted by the other coil. Alternatively, mechanical snap action may be provided by one of the known mechanical overcenter expedients. The pivoted member closes contacts 80X or 80Y by providing a conductive connection between each terminal pair. Closing contacts 80X or 80Y, respectively, energizes a conventional relay 82X or 82Y, respectively, by virtue of batteries 83X or 83Y in their respective circuits. Relay 82X and relay 82Y actuate double ganged switches 85X or 85Y, respectively, such that when the relay 82X is energized, relay 82Y will be deenergized and vice versa.

The operation of X-Y selection relay 75 is such that its pivot position is determined by the difference in current flow through the sensing resistors 68X and 68Y in series with the bridge circuit power supplies, the coil 78X or 78Y experiencing the greater current flow will cause the relay 75 to be actuated. The switch 80X or 80Y closes energizing its relay 82X or 82Y, thereby closing switch 85X or 85Y to an independent source of power 88X or 88Y to drive motor 56 or 38, respectively. For example, if coil 78Y receives greater current flow from brige circuit 64Y then coil 78X receives from bridge circuit 64X, pivot member 76 will be drawn toward coil 78Y closing contacts 80X. Closing contacts 80X will thereby energize relay 82X to actuate switch 85X to connect X motor 56 to an independent power source whose output, however, varies in accordance with the integrating potentiometer 91X. The relay which is not energized by the X-Y selection relay 76 leaves the bridge circuit 64Y connected to Y motor 38 through switches 85Y in its normal position. In this manner the connection of the dependent variable scanning-head curve-centering actuating means to its dependent variable motor is accomplished and acts as previously described. It should be explained in passing that the amplifiers 71X and 71Y are motor power amplifiers of a conventional type and the motors 38 and 56, respectively, may be either D.C. motors or two-phase A.C. motors depending on the type of overall system used. With the D.C. motor, the armature receives the signal, whereas with the two-phase A.C. motor, the variable phase receives the signal.

Referring now to FIG. 5, a diagram is shown which illustrates the coordinate fibers of scanning head 11 in a position wherein more X than Y coordinate fibers are darkened as the result of light reflection from the sheet being cut off by the line C. Line C, of course, absorbs light rather than reflecting it as does the surrounding lighter area. Let us assume that the X-axis in this illustration has been the axis along which the independent drive has been proceeding. Now, however, more of the X than Y fibers are deprived of light. As a consequence the total resistance of the filamentary photocells in the X bridge circuit 64X is higher than the total resistance of the filamentary photocells in the Y bridge 64Y since more Y photocells are energized by illumination and hence have their resistance reduced. Therefore, the current flow from generator 67X through resistor 68X, designated as $I_{bx}$, will be less than the current $I_{by}$ from generator 67Y flowing through resistor 68Y. Consequently, since the current through the solenoid 78X is less than the current through solenoid 78Y, the pivoted member 76 of X-Y selection relay will pivot point 77 toward relay core 78Y and will complete the circuit through contacts 80X, thus energizing solenoid 82X and pulling the switch 85X into its upper closed position so that the X motor is then connected across the output of independent voltage source 88X, which will be explained in detail hereafter. Although the voltage source 88X is variable, it is independent of position of the scanning head and will keep the X motor driving the scanning head in the X direction, which will be either positive or negative depending on which was selected. This condition will continue until the condition of switches 81X and 81Y is reversed in the reverse of the manner described above as the result of more Y fiber ends being covered by the curve than X fiber ends (the reverse of the situation pictured in FIG. 5).

The independent power supplies 88X and 88Y will now be explained. It will be noted that each independent power supply has a power source 90X or 90Y, respectively, which may be either an A.C. or a D.C. source just as power source 67X and 67Y may be, and the two are normally of the same type. In either event, the generator 90X is connected in parallel with a pair of parallel connected potentiometer elements 91X and 92X and generator 90Y is similarly connected with potentiometer 91Y and 92Y. The movable taps 93X and 93Y of the potentiometers 91X and 91Y, respectively, are manually set to a selected position which may be the midpoint. The movable taps 94X and 94Y of potentiometers 92X and 92Y, respectively, are positioned by shafts 95X and 95Y, which are driven through clutches 96X and 96Y, respectively, by the respective shafts of motors 56 and 38. The nature of the clutch is such that when the stop at either end of the potentiometer resistance is reached, the clutch will slip thereafter as long as the drive continues in the same direction. This arrangement serves to produce a sort of integration of the trend by the dependent variable drive motor as it follows the curve in all its turns. If tap 94X is in the corresponding position of tap 93X, no output will appear across these two taps. Otherwise, however, when tap 94X is moved to one side of the potentiometer 92X, the power source is in condition to produce a productive output, whereas as it moves to the other side of potentiometer, the power source is in condition to produce a negative output in the event of switching of the independent and dependent drives as described above. A positive output will cause the motor 56 to drive in one direction and a negative output will cause the motor 56 to drive in the opposite direction. The Y coordinate independent voltage source 88Y is similar in operation to source 88X. From the foregoing, it should be apparent that integration of the trend accomplished by the dependent drive effectively causes slight changes in the potentiometer position with each adjustment of the scanning head actuated thereby. For example, positive Y corrections will indicate that the curve is trending in the plus Y direction and should be followed on that course when switching to independent motion along the Y-axis. Conversely, if the Y corrections of the dependent drive are in the negative direction, a negative drive will be imposed on motor 38 when it becomes energized as the independent drive. In almost all instances, when switching occurs (for example, from the X-axis to Y-axis as the independent drive), the position of the potentiometer tap (e.g. tap 94Y) will be such that the independent drive will operate to cause the drive motor to rotate in the proper direction to permit the scanning head to continue to follow the curve in the proper direction. Only on very rare occasions may some manual correction be needed.

It can be imagined how various modified configurations of fiber locations in the scanning head might be used. For example, the Y shaped arrangement of FIG. 6 or of FIG. 8 might be used in connection with a triangular graphing arrangement with three axes. Of course, the logic and drive arrangements would have to be different from the X-Y coordinate system described above, but the system might be of much the same type. The fanned out array of fibers, as in FIG. 8, can be employed with this coordinate system and might be selected for use in any system requiring greater sensitivity as deviation from the center of the scanning head occurs.

The use of the FIG. 9 scanning head arrangement, which is similar to the FIG. 10 arrangement previously mentioned, is best limited to a situation in which the curve does not tend to have portions that approach parallelism with the row of optical fiber ends.

The sensing head arrangement of FIG. 7 shows the preferred coordinate arrangement described in connection with FIGS. 4 and 5.

In all cases, the fiber ends in the scanning head are kept small with respect to the line to be followed and preferably sufficiently close spaced that a transverse section of the line being followed will overlap two or more of the fibers at all times. It will be obvious that the cleaner cut the edges of the curve, the better the job of following which can be done, but some degree of versatility is provided by the present system.

As previously stated, FIG. 10 is illustrative of the bottom of the code sensing head 35 and is equally representative of sensing head 45 rotated 90° about its principal axes, both of which operate in the same manner in conjunction with their associated coded scales but have their fiber end groupings normal to one another. FIG. 12 is a schematic diagram of the optical fibers 100 and associated apparatus embodied in the sensing heads 35 and 45, respectively. The fibers are held in a fixed spaced relationship in the scale sensing head 102 which may be a suitable transparent resinous material, being cast therein. The fibers are advantageously in a linear array normal to the code as shown in FIG. 10. Each of the optical fibers 100 has an associated photocell 104 for converting a light effect into an electrical effect, as described in my co-pending application entitled "Filamentary Photocell Device." Beneath the ends of the optical fibers 100 is the previously mentioned coded scale 23 on the base 10. The coded scale may be of the binary coded decimal type partially shown in FIG. 11. Each of the units, tens, hundreds and thousands digits on scale 23 in FIG. 11 is represented by four columns which are needed to represent in binary form numbers between 0 and 9 in each successive position of units, tens, hundreds and thousands areas. The code serves as a scale measuring the distance from a selected origin along the selected axis, here the Y axis. The binary coding is effected in a particular row of increments of the columns sensed by the head by providing light and dark areas, providing light reflecting and light absorbing areas, respectively. As the sensing head moves along the scale, the pattern changes in accordance with position in accordance with the calibration of the system. The four columns of Arabic numbers, generally designated 110, to the left of the coded scale represent the cyclic decimal number designations corresponding to the binary coded areas along the same row. These decimal numbers do not actually appear on the scale of course but have been reset here for convenience in identifying the code pattern. Various unit-distance codes, such as Gray code, may be used. It will be appreciated by those skilled in the art that fiber optics easily makes possible rows less than a hundredth and even less than a thousandth of an inch wide in the direction of movement of the sensing head.

Referring again to FIG. 12, the output of each of the photocells 104 associated with fibers 100 is coupled by electrical connection, such as connection 112, to a readback converter 114. The readback converter 114 correlates and stores the coordinate information sensed by the optical fibers 100 in a conventional manner. Thus, as the sensing heads 45 and 35 move along the respective X and Y axes over the scales 46 and 23, is illustrated in FIG. 1, the coordinates locating of the scanning head 11 with respect to the X and Y axes are identified and recorded together in the readback converter 114. By taking successive readings as the curve is followed, the shape of the curve can be recorded in as much detail as is required, more detail being provided by recording more frequent position readings. Of course, instead of storing the output of the sensing heads, the information might be used immediately and not stored. Reading may be taken at selected time intervals using a suitable timer to permit reading or recording automatically the coordinate information. Alternatively, after a predetermined number of code rows along the independent axis, readings may be programmed.

A sensing head of the present invention, like that shown in FIG. 12, may be used to create as well as read a coded scale in various binary codes. As shown in FIG. 12, each of the optical fibers 100 is provided with a small discretely energized light source 120, each fiber being arranged to transmit light only from its associated light source. In recording, the fibers retain the arrangement in groups of four for each of the units, tens, hundreds and thousands digits representations used in reading. The light sources are electrically connected to power through switch means controlled by an input encoder 122 which sequentially energizes the proper combinations of light sources in accordance with the desired coding pattern, in accordance with the position of the sensing head at the time. Beneath the scanning head 102, there is located a photosensitive sheet or light affectable surface, preferable film with a photographic emulsion thereon having selected areas in successive rows exposed as the sensing head moves along the sheet to make the scale. The drive for the sensing head is synchronized with or drives the input encoder which may be a precision shaft encoder having gear like code wheels, one for each fiber, which actuate switches open and closed in the predetermined pattern necessary to produce the code. Alternatively, the encoder may have a commutator with conductive areas beneath brushes when the lights are to be on and insulating areas beneath the brushes when the lights are to be off. In that case at least one brush and one track are required for each light. In cases requiring creation of a scale at a higher speed than permitted by the time constant of incandescent filaments, small gas discharge sources of light may be used for the light sources 120. After the scale has been exposed in accordance with the process adopted, it must, of course, be developed by a suitable process in accordance with known techniques. This may be done with the scale in place using some techniques or alternatively the scale may be taken up and replaced in proper position after being developed.

In accordance with the present invention, other applications for codes of the type described above are visualized and other apparatus for reading or creating coded scales are possible. For example, FIG. 13 illustrates an apparatus which may be used to create or read codes of the general type shown in FIG. 11. A linear array of optical fibers 130 is shown, the optical fibers being divided into four groups of four fibers representing units, tens, hundreds and thousands digits and a seventeenth fiber for tracking purposes. Each of the optical fibers 130 has associated with it a photocell, the output of which is coupled by electrical connectors, such as illustrated with connectors 132, to a readback converter 136. The readback converter 136 in FIG. 13 operates in the same manner as described in regard to the readback converter of FIGS. 1 and 12. Each optical fiber 130 has associated with it a separate light source 138 which is coupled to an input encoder 140, which preferably operates in the same manner as the input encoder of FIG. 12. Beneath the optical fibers 130 is the scale or sheet to be coded 142. The sheet is coded by selectively providing transparent or opaque areas as the alternatives of binary coding. If the sheet is to be coded, it may not yet be transparent in any area but provide a light affected surface which can be photographically or otherwise processed to make the code of transparent and opaque areas. The sheet 142 is secured on a transparent drum 144 so that its columns extend around the drum and its rows extend along elements of the drum. The rotation of the drum is produced by motor 146 such that the columns on the sheet move past the row of optical fibers 130 in the fixed sensing head. After a coded scale has been created, the digital representation in the binary system may be readback constant by illumination of the light sources 148 behind each column and associated in turn with each of the optical fibers 130. Opaque areas will then block light whereas transparent areas will permit light to pass to the optical fibers for accurate reading of the coded scale. This technique permits reading and recording codes of microscopic size much reduced over the size shown in FIG. 13. Alignment of the scale in relation to the fibers must be maintained and is particularly difficult with ultra small scales. This is accomplished, however, by optical fiber 150 and associated photoelectric cell 152 to sense and track an opaque guide line 154 on the transparent sheet 142. The guide line 154 is made simultaneously with the coded scale by a light source 155 whose light is transmitted by fiber 150 to continuously expose a column on the light sensitive sheet. After development, when a readback operation is being performed, an associated light source in drum 144 is provided for illuminating the area of the scale beneath fiber 150. The fiber 150 tracks the margin of line 154 helping a balance between the adjacent light and dark areas. Whenever fiber 150 moves off the margin of guide line 154, it will be returned by the associated apparatus electrically coupled to the photocell 152.

The photocell 152 is electrically coupled to a bridge or other device 156 which controls the operation of a reversible motor 158 in such manner to drive in one direction to restore the balance upon decrease in the amount of light and in the other direction to restore the balance upon increase in the amount of light. Motor 158 operates to turn a worm 160 meshing with a sleeve 162 of a movable bearing which controls the axial position of the drum 144 on its drive shaft. If desired, a plurality of optical fibers having photoelectric cells and an associated bridge circuit similar to that described in FIG. 4 may be used for following the guide line 154 and positioning the drum and scale.

FIG. 14 illustrates an alternative embodiment of the apparatus of FIG. 13 used to create or read coded scales. In FIG. 14, numbers corresponding to those used in FIG. 13 with the addition of primes thereto identify parts corresponding in function. FIG. 14 differs from FIG. 13 in that a single light source 170 is used to illuminate the coded scale 171, which in this case is not a transparent sheet, during a readback operation, and the coded scale 171 is secured on a continuous belt arrangement by four rollers 172, 174, 176 and 178 spaced to move the sheet arranged with its columns parallel to the edges of the belt. In FIG. 14 roller 172 is driven by motor 146' to move the sheet 171 beneath the sensing head.

Other modifications of the optical fiber transducer and its system described herein will occur to those skilled in the art. All such modifications are intended to be within the scope and spirit of the present invention as defined by the appended claims.

I claim:
1. Optical fiber transducer curve following apparatus comprising in combination, a curve support base on which a curve illustration may be located,
   bridge means movable across the curve support base in a predetermined manner,
   bridge drive means for driving said bridge means across said curve support base,
   a scanning head movably supported on said bridge means to move in a predetermined path along said bridge means transverse to the direction of movement of said bridge means,
   said scanning head comprising a plurality of optical fibers having their ends in a closely grouped array and positioned to pick up light reflected from said curve illustration,
   a plurality of photocells each photocell associated with a different one of said fibers,
   scanning head drive means for moving said scanning head along said bridge means,
   first circuit means for connecting at least some of said photocells to one of said drive means to cause said one drive means to center said scanning head on said curve being followed by said scanning head,
   second circuit means for connecting the other of said drive means to a source of power to operate as an independent drive means,
   third circuit means for connecting the other than the at least some of said photocells to the said other of said drive means to cause said other drive means to center said scanning head on said curve being followed by said scanning head, and
   switch means for changing from the arrangement in which said first circuit means is connected to one drive means and said second circuit means is connected to the other drive means to the arrangement in which said second circuit means is connected to the one drive means and said third circuit means is connected to the other drive means.

2. The apparatus of claim 1 in which the respective groups of fibers associated with the respective groups of photocells associated with the first and third circuit means are arranged in patterns mutually transverse to one another across said scanning head.

3. The apparatus of claim 2 in which said first and third circuit means alternatively connecting their respective groups of said photocells to said one drive means and said other drive means, respectively, comprise bridge circuits, each having a pair of input terminals and a pair of output terminals, each bridge circuit having connected in two arms thereof photocells from optical fibers of one of the mutually transverse groups, those fibers at one side of the intersection of the two groups being connected in one arm of the bridge and those fibers at the other side of the intersection being connected to the other arm of the bridge.

4. The apparatus of claim 3 in which said photocells are connected in parallel in each of said arms, said apparatus further comprising means for varying the sensitivity of said bridge such that the photocells associated with fibers nearer the intersection have greatest effect on restoring forces than do more remotely located fibers.

5. The apparatus of claim 4 in which said switch means comprises:
a selection relay having two contact positions;
sensing means located one in each of said bridge circuits for providing an output indicative of current flow in said bridge circuit;
actuator means associated with each of said sensing means responsive to the output of each thereof for actuating said selection relay between its two contact positions for connecting alternatively one of said bridge circuits to one of said drive means, the other drive means being connected to said second circuit means.

6. Optical fiber transducer scale sensing means comprising in combination:
support base means;
bridge means providing a movable member movable in a predetermined manner relative to the base across said base;
bridge drive means for driving said bridge means across said base;
a carriage providing a movable member movable in a predetermined manner relative to said bridge means on said bridge means transverse to the direction of movement of said bridge means;
carriage drive means for moving said carriage across said bridge means;
a scale sensing head located on one of said movable members;
a scale having columns and cooperating with said scale sensing head located on the means relative to which said one movable member is movable in a predetermined manner; and
said scale sensing head comprising an array of optical fibers whose ends are fixed relative to one another so that each fiber scans one of said columns of said scale.

7. The optical fiber transducer scale sensing means of claim 6 further comprising a plurality of photocells each photocell associated with a different one of said fibers, and storage means electrically coupled to each of said photocells for identifying and storing information scanned by said fibers.

8. The optical fiber transducer scale sensing means of claim 6 in which a scale sensing head is located on each of the movable members and a scale cooperating with the scale sensing head is provided for each of said sensing heads.

9. Optical fiber transducer means comprising in combination:
a support base means;
bridge means providing a movable member movable in a predetermined manner relative to the base across said base;
bridge drive means for moving said bridge means across said base;
a carriage providing a movable member movable in a predetermined manner relative to said bridge means on said bridge means transverse to the direction of movement of said bridge means;
carriage drive means for moving said carriage along said bridge means;
a sensing head located on one of said movable members;
a light senstitive sheet cooperating with said sensing head located on the means relative to which said one movable member is movable in a predetermined manner and having a light affectable surface;
said sensing head comprising an array of optical fibers whose ends are fixed relative to one another so as to scan columns on said sheet;
a plurality of light sources, each light source associated with a different one of said fibers;
encoder means to selectively light and extinguish said light sources in accordance with a predetermined sequence;
whereby successive incremental positions of said sensing head as it is moved along said sheet by said movable member are exposed in patterns of light affecting said light affectable surface, which patterns when developed provide a coded scale indicative of said incremental positions.

10. The optical fiber transducer means of claim 9 further comprising a plurality of photocells each photocell associated with a different one of said fibers, and storage means electrically connected to each of said photocells for identifying and storing information sensed by said fibers, as from a coded scale, produced by said sensing head.

11. A method of making a coded scale having columns representing coded numbers comprising:
providing a light sensitive sheet having a light affectable surface;
driving a sensing head having an array of optical fibers along said sheet past a plurality of selected stations;
lighting and extinguishing individual light sources associated with each of the respective fibers to transmit light in a unique pattern through said optical fibers at each selected station; and
developing said sheet to provide a coded record representative of the successive selected stations of said sensing head along said sheet.

12. A method of following a curve comprising:
positioning a scanning head to sense a curve in one position,
driving said scanning head with an independent drive past the curve,
producing an error signal each time the scanning head departs from the curve,
moving said scanning head in response to error signals by a dependent drive as said independent drive progresses to cause the scanning head to follow the curve, and
upon the sensing of a predetermined change in orientation of the curve interchanging the independent and dependent drives.

13. A method of following a curve positioned with respect to a pair of mutually perpendicular axes comprising:
driving a scanning head with an independent drive along one of said axes, ·
moving said scanning head in accordance with variations in position of said curve by a dependent drive relative to the other of said axes as the independent drive progresses, and changing the independent drive and dependent drive between the different axes when said curve approaches paralleling the axis associated with said dependent drive.

14. Optical fiber transducer means comprising:

a sensing head including an array of optical fibers whose ends are fixed relative to one another;

a light sensitive sheet having a light affectable surface and located along the path of movement of said ends of said optical fibers for being exposed by light therefrom;

drive means for producing relative movement between said sheet and said sensing head;

a plurality of light sources each light source associated with a different one of said fibers; and encoder means for selectively energizing and extinguishing said light sources in accordance with a predetermined sequence, whereby said fibers transmit said light toward said sheet for exposing or not exposing successive increments in columns on said sheet defined by the locations of the respective optical fibers.

15. The optical fiber transducer means of claim 14 further comprising a plurality of photocells, each photocell associated with a different one of said fibers, and storage means electrically connected to each of said photocells for identifying and storing information transmitted through said photocells from said light sources or from a scale.

16. The optical fiber transducer means of claim 15 in which light source means is provided for illuminating a coded scale moving relative to said sensing head beneath said sensing head in response to said drive means, whereby said fibers will pick up light from said scale for reading incremental positions indicated on said scale, said light being picked up by said fibers and transmitted through said photocells to said storage means.

References Cited

UNITED STATES PATENTS

| | | | |
|---|---|---|---|
| 2,423,440 | 7/1947 | De Neergaard | 250—202 X |
| 2,838,683 | 6/1958 | Munro | 250—202 X |
| 2,951,736 | 9/1960 | Black. | |
| 3,029,717 | 4/1962 | Hildebrandt | 350—96 X |
| 3,104,324 | 9/1963 | Rabinow | 250—227 |
| 3,106,706 | 10/1963 | Kolanowski et al. | |
| 3,113,313 | 12/1963 | Roberts | 346—31 X |
| 3,198,949 | 8/1965 | Holdo | 250—202 |
| 3,310,681 | 3/1967 | Hargens | 250—227 |
| 3,335,287 | 8/1967 | Hargens | 250—227 |
| 3,354,319 | 11/1967 | Loewen et al. | 250—227 |

FOREIGN PATENTS 898,516 6/1962 Great Britain.

OTHER REFERENCES

Hamrick et al., IBM Technical Disclosure, vol. 4, No. 7, December 1961, p. 85.

Sharp, IBM Technical Disclosure, vol. 5, No. 3, August 1962, p. 14.

RALPH G. NILSON, *Primary Examiner.*

M. A. LEAVITT, *Assistant Examiner.*

U.S. DEPARTMENT OF COMMERCE
PATENT OFFICE
Washington, D.C. 20231

UNITED STATES PATENT OFFICE
CERTIFICATE OF CORRECTION

Patent No. 3,403,263                      September 24, 1968

Charles W. Hargens III

It is certified that error appears in the above identified patent and that said Letters Patent are hereby corrected as shown below:

Column 1, line 66, "elertrical" should read -- electrical --. Column 2, line 3, "conduit" should read -- conduct --. Column 4 line 23, beginning with "11 to sense" cancel all to and includin "monitored." in line 26, same column 4, and insert -- head in the X-axis direction. The combination of movements along the X- and Y-axes enables the scanning head 11 to sense any coordinate position over the total area being monitored. --; line 53, cancel "across", second occurrence. Column 8, line 8, "then" should re -- than --. Column 9, line 14, "productive" should read -- positive --. Column 10, line 47, "is" should read -- as --.

Signed and sealed this 24th day of February 1970.

(SEAL)
Attest:

Edward M. Fletcher, Jr.
Attesting Officer

WILLIAM E. SCHUYLER, JR.
Commissioner of Patents